Figure 1:
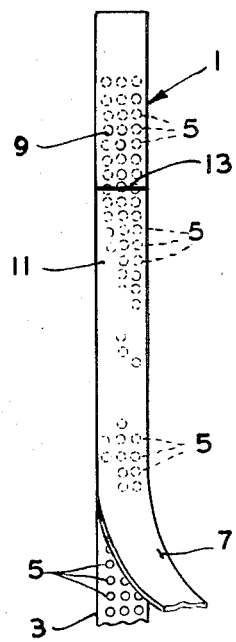

United States Patent

[11] 3,599,596

[72] Inventors Casimer F. Remus
Tunkhannock;
John Alan Moore, South Montrose, both of, Pa.
[21] Appl. No. 864,476
[22] Filed Oct. 7, 1969
[45] Patented Aug. 17, 1971
[73] Assignee The Bendix Corporation

[54] METALLIC TAPE FOR VERTICAL SCALE INSTRUMENTS
9 Claims, 4 Drawing Figs.
[52] U.S. Cl. ............................................. 116/114,
29/193, 40/133, 116/129, 58/127, 161/113
[51] Int. Cl. ................................................ G01d 21/00
[50] Field of Search ........................................ 116/129,
135, 114; 29/180, 191.6, 193; 33/107, 135, 137;
40/133, 135; 58/50, 127; 117/99; 156/252, 300,
512, 513, 514; 161/113, 114, 115, 189; 250/236

[56] References Cited
UNITED STATES PATENTS

| | | | |
|---|---|---|---|
| 578,044 | 3/1897 | Pathie | 40/135 |
| 1,118,866 | 11/1914 | Jones | 40/133 |
| 1,647,014 | 10/1927 | Pattison | 40/133 X |
| 1,647,090 | 10/1927 | Globus | 40/133 X |
| 2,278,520 | 4/1942 | Klein et al. | 116/129 |
| 2,563,537 | 8/1951 | Lash | 116/129 |
| 2,588,498 | 3/1952 | Driskill et al | 33/107 |
| 3,149,430 | 9/1964 | Szabo et al. | 116/129 X |
| 3,245,375 | 4/1966 | Fiedler | 116/129 |
| 2,710,821 | 6/1955 | Fischer | 161/189 X |
| 3,330,709 | 7/1967 | Zelnick | 33/137 X |
| 3,442,741 | 5/1969 | Specht | 161/113 X |

FOREIGN PATENTS

| | | | |
|---|---|---|---|
| 561,001 | 7/1923 | France | 161/115 |

Primary Examiner—Louis J. Capozi
Attorneys—Plante, Hartz, Smith & Thompson and S. H. Hartz ABSTRACT: An indicating member for an instrument comprising a thin perforated metallic element and a translucent film laminated to the metallic element and arranged to overlay the perforations so that light from a source behind the metallic element transilluminates the translucent film through the perforations in the metallic element. The indicating member may be in the form of an elongated tape for a vertical scale indicator or in the form of a dial for a pointer-type instrument.

PATENTED AUG 17 1971

3,599,596

INVENTORS
CASIMER F. REMUS
JOHN ALAN. MOORE
BY
ATTORNEY

METALLIC TAPE FOR VERTICAL SCALE INSTRUMENTS

The invention relates to indicating instruments and more particularly to self-lighted instruments. Heretofore, vertical scale indicators having moving tapes to display the readout used translucent nonmetallic bands of Dacron, Nylon fabric, glass-filled fabrics, etc., to provide transillumination. The tapes were subject to excessive changes in length due to temperature and to tensions applied by takeup springs. Guiding rollers and/or flanged bearings caused the tape edges to fray and this contaminated the instrument and the tape presented an unsightly appearance. Despite these disadvantages such tapes continued to be used because of the need for translucency to enable areas of the tape to be transilluminated from a light source behind the tape.

Also, in indicators having a dial and pointer the dial was made of plastic to provide transillumination. However, plastic holds moisture and fogging problems resulted.

The invention contemplates an indicating member for an instrument comprising a thin perforated metallic element and a translucent film laminated to the metallic element and arranged so that light from a source behind the metallic element transilluminates the translucent film through the perforations in the metallic element. The element may be of steel and the film a polyvinyl fluoride substance.

One object of the present invention is to provide a transilluminated indicating member for an instrument which is not appreciably affected by changes in temperature or by wear and is substantially free from moisture absorption.

Another object of the invention is to provide a tape for a vertical scale indicator which may be transilluminated and is not appreciably affected by temperature, wear or moisture.

Another object of the invention is to provide a tape formed by a perforated steel band having a film of polyvinyl fluoride laminated thereto and arranged so that light from a source behind the steel band transilluminates the film through the perforations in the steel band.

Another object of the invention is to provide a dial for a pointer-type indicator formed by a perforated steel disc having a film of polyvinyl fluoride laminated thereto and arranged so that light from a source behind the disc transilluminates the film through the perforations in the disc.

These and other objects and features of the invention are pointed out in the following description in terms of the embodiments thereof which are shown in the accompanying drawing. It is to be understood, however, that the drawing is for the purpose of illustration only and is not a definition of the limits of the invention, reference being had to the appended claims for this purpose.

Figure 2:
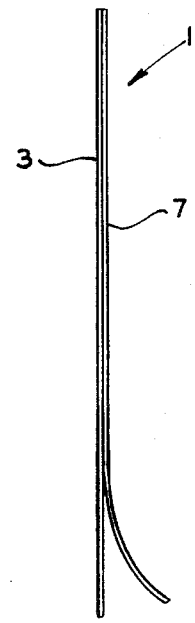
Figure 3:
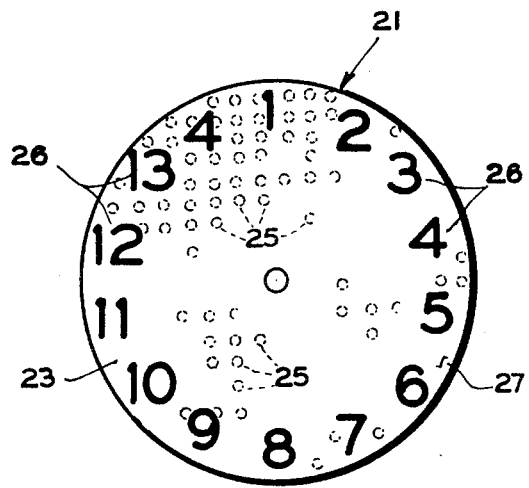
Figure 4:
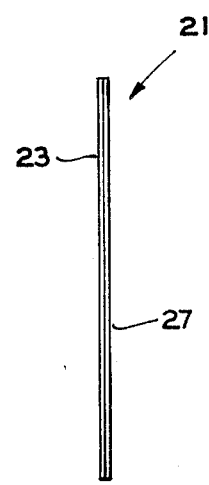

In the drawing:

FIG. 1 is a front view of a tape constructed according to the invention for a vertical scale indicator, FIG. 2 is a side view thereof, FIG. 3 is a front view of a dial constructed according to the invention for a pointer-type indicating instrument, and FIG. 4 is a side view thereof.

In the drawing, FIGS. 1 and 2 show a novel tape 1 constructed according to the invention especially adapted for use in a vertical scale indicator of the kind shown and described in copending application, Ser. No. 854,483 filed on Sept. 2, 1969 and assigned to the same assignee as the present application. The tape comprises a metal band 3 preferably of steel, although any other suitable metal may be used. The band is relatively thin and may be approximately 0.001 inches thick and of a length and width suitable for use in a vertical scale instrument. The band is perforated substantially uniformly with relatively small holes 5 by drilling, chemically milling, or punching in areas to be transilluminated. A sheet of polyvinyl 7, sold by E. I. Dupont DeNemours & Co. Inc., under the trade name "Tedlar," is laminated to the band by heat and pressure and preferably is of the same thickness as the band. The polyvinyl fluoride film is then painted any suitable color or colors 9, 11, as determined by the instrument design. The line 13 formed by the junction of the two colors is used as the index.

Light from a source (not shown) behind tape 1 passes through holes 5 in band 3 and is diffused by the film and paint to provide a reasonably uniform lighted area. The size, shape, quantity and location of holes 5 in tape 1 determines the strength and flexibility of the tape and the amount of light transmitted.

In FIGS. 3 and 4, a dial 21 constructed according to the invention may be used in a pointer-type indicating instrument and is shown as comprising a metal disc 23 of steel or other suitable metallic material having perforations 25 therein of relatively small diameter and preferably substantially uniformly positioned in the plate. The plate may have indicia 26 formed therein also. Plate 23 may be relatively thin in the order of 0.001 inches. A thin sheet 27 of polyvinyl fluoride is laminated to the perforated plate by heat and pressure and preferably is of the same thickness as the plate. The polyvinyl fluoride film may be painted any suitable color or colors. Light from a source (not shown) behind the plate passes through the perforations and indicia in the plate and is diffused by the film and paint to provide a reasonably uniform lighted area. Indicia in the form of letters, numbers, indices, or other characters may be provided on the member. The indicia may be painted on the surface of the translucent film or may be formed in the metal. The main purpose of the perforations is for back lighting the indicator.

An indicating member, such as the flexible tape for a vertical scale indicator or the dial for a pointer-type indicator, constructed according to the invention, is not appreciably affected by changes in temperature and is substantially free from moisture absorption. The flexible tape does not fray or stretch. While the perforations in the metallic member transmit light from a source at the rear, the perforations are not readily apparent when the indicating member is front lighted or viewed in daylight since the painted film appears completely homogeneous.

What we claim is:

1. An indicating member for an instrument or the like comprising a thin perforated metallic element and a translucent film laminated to the metallic element and arranged to overlay the perforations so that light from a source behind the indicating member is visible through the perforations and is diffused by the film to transilluminate the indicating member, and indicia on the member for presenting an indication.

2. An indicating member of the kind described in claim 1 in which the element is in the form of a flexible band for use on vertical scale instruments.

3. An indicating member of the kind described in claim 1 in which the element is platelike and forms a dial of an indicating instrument.

4. An indicating member of the kind described in claim 1 in which the metallic element and translucent film are relatively thin and of substantially the same thickness.

5. An indicating member of the kind described in claim 1 in which the metallic element is made of steel.

6. An indicating member of the kind described in claim 1 in which the translucent film is a polyvinyl fluoride substance.

7. An indicating member of the kind described in claim 1 in which the translucent film is painted.

8. An indicating member of the kind described in claim 2 in which the translucent film is painted several colors and a line formed by the junction of two colors is used as an index.

9. An indicating member as described in claim 3 in which the platelike element has indicia formed therein and light from a source behind the indicating member transilluminates the indicia.